Aug. 3, 1965  G. W. ANDERSON  3,198,384
INFLATING MEANS FOR LIFE SAVING DEVICES
Filed Sept. 18, 1962  2 Sheets-Sheet 1
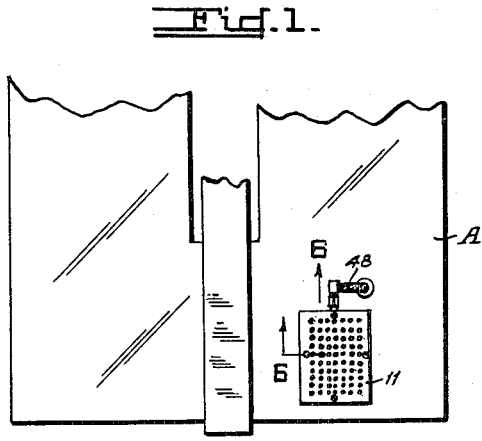
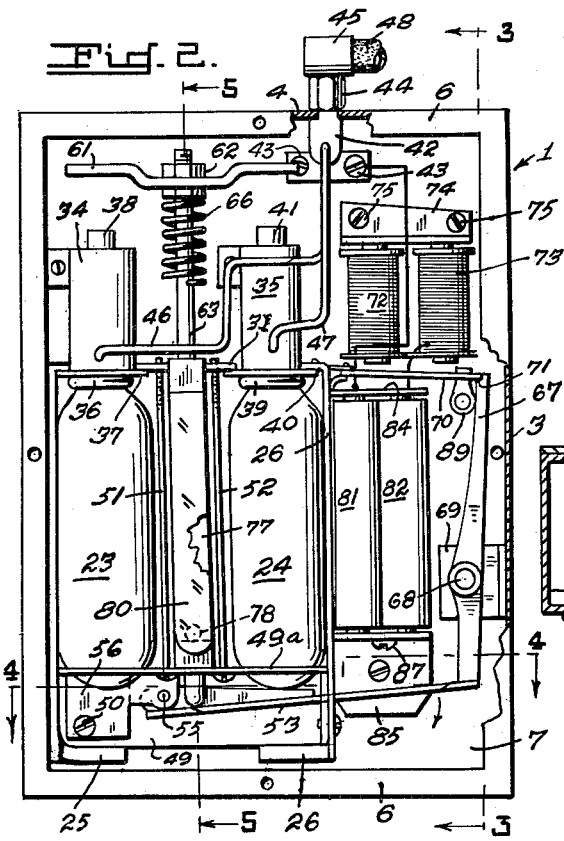
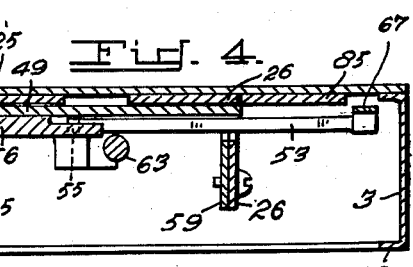
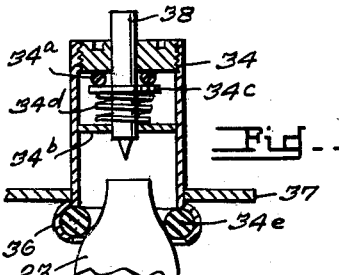
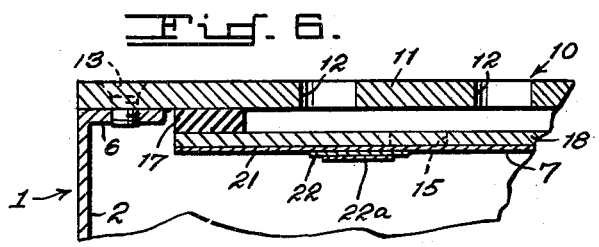
INVENTOR.
George W. Anderson
BY
Elizabeth Newton Dew
ATTORNEY

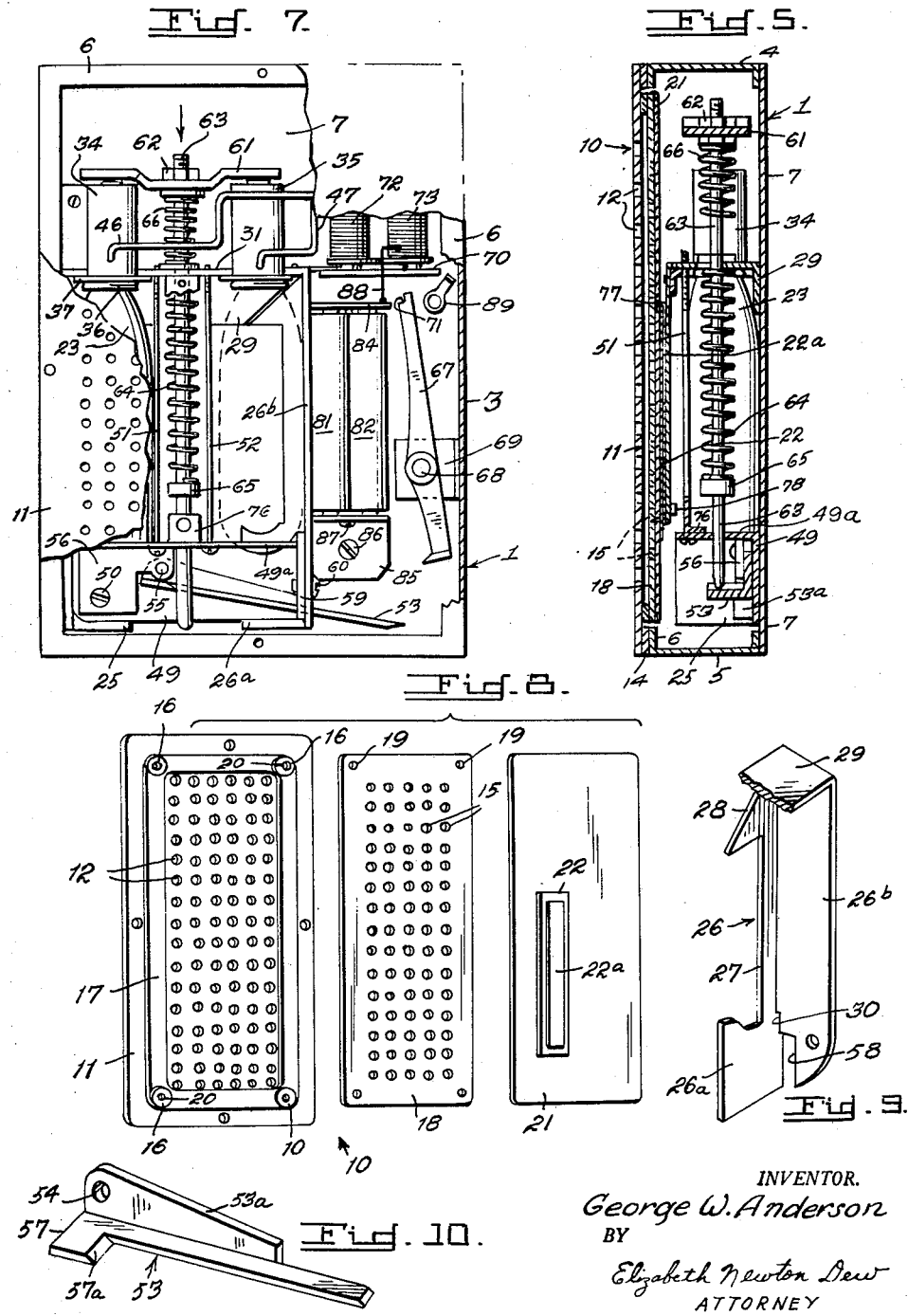

United States Patent Office 3,198,384
Patented Aug. 3, 1965

3,198,384
INFLATING MEANS FOR LIFE SAVING DEVICES
George Willard Anderson, 445 NW. 127th St.,
Miami, Fla.
Filed Sept. 18, 1962, Ser. No. 224,475
11 Claims. (Cl. 222—5)

This invention relates to automatic, pressure-responsive inflating means and, more particularly, to means for automatically inflating a life-preserver or life-saving apparatus, in response to immersion.

It is the chief object of the invention to provide a device of the kind mentioned, which is extremely sensitive and thus responsive to a hydrostatic pressure of only a few inches of water.

Another object is to provide an automatic inflating device which is triggered by electromagnetic means in circuit with a microswitch closed by pressure upon a diaphragm.

Another object is to provide an inflating means of the type mentioned, which is extremely sensitive, compact, reliable in operation, easily serviced, repaired, adjusted and re-set, re-usable an indefinite number of times and versatile in use.

Still another object is to provide an inflating mechanism which, being automatically triggered by immersion, requires no volition on the part of the wearer to become operative.

Other objects and advantages will become clear to those skilled in the art, after a study of the following detailed description, in connection with the accompanying drawings.

In these drawings:

FIGURE 1 is an elevation to a relatively small scale, showing a portion of an inflatable life-saving jacket with the invention attached thereto;

FIGURE 2 is an elevation to a scale greatly enlarged over that of FIGURE 1, showing the invention with the front cover assembly removed and the parts in cocked or firing positions;

FIGURE 3 is a section to the same scale as FIGURE 2, taken in a plane identified by line 3—3, FIGURE 2;

FIGURE 4 is a section taken in a plane identified by line 4—4, FIGURE 2;

FIGURE 5 is a section in a plane identified by line 5—5, FIGURE 2;

FIGURE 6 is a detail sectional view to a still further enlarged scale, as indicated by line 6—6, FIGURE 1, showing the front cover plate assembly;

FIGURE 7 is an elevation corresponding generally with FIGURE 2, but partly in section and with certain parts removed, showing the positions of the parts after firing;

FIGURE 8 is an exploded view showing the cover plate and diaphragm assembly;

FIGURE 9 is a perspective view of a portion of the frame for mounting the pressure capsules, firing pins, and related items;

FIGURE 10 is a perspective view to a scale enlarged over that of FIGURE 7, showing the hammer release lever; and FIGURE 11 is a sectional detail view to a scale enlarged over that of FIGURE 2, and showing the mounting of one of the two duplicate firing pins.

Referring in detail to the drawings, 1 identifies generally a rectangular or parallelepipedal casing of stainless steel or other non-corrodible metal, having left and right side walls 2 and 3, and top and bottom walls 4 and 5. As indicated at 6, FIGURES 3 and 4, both edges of these side walls are flanged inwardly. At the corners of the back, these flanges are filleted to provide areas for threaded holes by which a back or bottom cover 7 is secured in place by four screws, as indicated at 8, FIGURE 3. A gasket 9 interposed between back plate 7 and the contiguous flanges 6, effects a fluid- and pressure-tight seal or joint.

The front or top cover assembly is identified generally at 10, FIGURES 5, 6 and 8, and comprises a plate 11 having therein a plurality of regularly-spaced holes 12 extending over its entire central area and secured to the contiguous flanges 6 of the side walls by four screws 13, FIGURE 6, one at the mid-portion of each front flange. A gasket 14, FIGURE 5, is interposed between the peripheral edges of plate 11 and the contiguous flanges, to form a fluid-tight seal at their meeting surfaces.

As best shown upon FIGURE 8, four spacer studs 16 are integrally connected with plate 11 adjacent the respective corners thereof, to define a rectangle a little larger than, and bounding, the correspondingly-shaped area containing holes 12. A rectangular gasket 17 of rubber, cork, or like material, is cut away at its corners to fit about the studs and to occupy the peripheral areas between them. The gasket has a thickness a little greater than the axial dimension of the studs. The studs and gasket 17 are so sized and disposed as to have a loose fit within the edges of the contiguous flanges 6 of the casing, as indicated upon FIGURE 6.

A second perforated plate 18, also of non-corrodible metal and of the same size as gasket 17, is fixed to plate 11 as by small screws or rivets each passing through a pair of holes 19 and 20 at the corners of plate 18 and in studs 16, respectively, to make a fluid-tight seal with the gasket 17 about the peripheral edges thereof. As is clear from FIGURES 6 and 8, holes 15 in plate 18 are uniformly distributed over the entire area thereof bounded by gasket 17. However, each hole in plate 18 is offset horizontally and vertically from those in plate 11 so that in assembled relation it is impossible to trigger the device by the insertion of a sharp object through holes 12. At the same time the underlying diaphragm 21 is subject to hydrostatic pressure externally of the casing. Diaphragm 21 is of soft pliable leather or like sheet material and is secured along its edges, as by adhesive, to plate 18 to completely cover the holes therein. Thus in the assembled instrument, water or fluid pressure acting externally upon the casing, is effective upon diaphragm 21 through holes 12 and 15, while the interior of the casing is fluid- and pressure-tight. As shown upon FIGURE 8, diaphragm sheet 21 has secured to it, a pair of small rectangular filler pieces 22 and 22a. The purpose of these will be subsequently described. All operating mechanism is secured to back plate 7 so that when this plate is removed by removing the screws holding it to flanges 6, all parts are exposed for facile adjustment, replacement, or repair.

The source of inflating pressure is supplied by a pair of $CO_2$ capsules or cartridges 23 and 24 such as are conventionally used in soda dispensers and which, as is well known, have a pierceable neck or flask portion for release of the pressurized gas therein. These capsules are mounted in a frame member which comprises a length of metal 90° angle having one flange thereof notched and bent into the form of an inverted "U" to form left and right sides 25 and 26, FIGURES 2, 4 and 7, and a top portion 29. The right side of this frame is shown in perspective upon FIGURE 9, one edge of one notch being indicated at 28. The other side 25 is essentially of the same form as side 26 so that a description of side 26 is sufficient. Still referring to FIGURE 9, flange 26a and the corresponding flange of side 25, are secured as by rivets, to back plate 7. Flange 26a is cut away as indicated at 27 to accommodate capsule 24. Flange 26b is slotted at 30 to avoid obstruction of the release lever subsequently described. This slot, of course, may be omitted in the corresponding flange of frame side 25.

The top portion of the frame, identified at 29, appears in FIGURES 2, 5 and 7. The horizontal or outstanding flange of this portion has spaced notches to receive with a smooth fit a respective one of two firing pin cylinders 34 and 35, FIGURES 2 and 7. These cylinders are of identical construction so that a description of 34 will suffice.

Member 34 comprises a cylinder of brass or other non-corrodible material, and has a flanged lower end 36, FIGURES 7 and 11. A rectangular plate 37 is centrally apertured to receive the cylinder with a smooth fit. Likewise, the cylinder has a smooth fit in the corresponding notch or slot in the flange of top frame portion 29. Since the plate is positioned beneath the flange, it acts as an abutment limiting upward movement of the cylinder to that shown upon FIGURES 2 and 7, for example. It also acts as a stiffener for the top portion of the frame.

FIGURE 11 shows cylinder 34 in axial section, from which it is noted that firing pin 38 has a smooth sliding fit and projects upwardly through a central aperture in the top end of the cylinder. A rubber seal ring 34a effects a gas-tight seal between the pin and aperture. The cylinder is equipped with a guide 34b fixed interiorly thereof and also centrally apertured to guide the pin in axial translation so that its lower pointed end will certainly pierce the underlying capsule 23. A collar 34c is fixed to and surrounds the shank portion of the pin, and a coil spring 34d acts between the collar and guide to urge the pin into its upper limiting position shown. The lower apertured end of the cylinder is fitted with a rubber seal 34e so that when the capsule is forced upwardly by means subsequently described, a gas-tight joint is effected, so that gas escaping into the cylinder from the punctured capsule cannot escape therefrom except by pipe 46, FIGURE 2, as subsequently described. As previously noted, the other cylinder 35 is identical in construction with 34 so that, referring to FIGURE 2, it is sufficient to identify flange 39, plate 40, and firing pin 41.

As best shown upon FIGURE 2, top wall 4 is apertured to receive and pass a male brass fitting 42 having an integral bracket secured by screws 43 to back plate 7. The arrangement is such that the threaded portion of the fitting projects upwardly beyond the casing when the back plate is fully seated, to receive a coupling 44 swiveled to an elbow 45. A pair of small-bore copper tubes 46 and 47 connect the interiors of sleeves or cylinders 34 and 35, respectively, with fitting 42. When the coupling is turned down as depicted upon FIGURE 2, a pressure-tight connection is made between elbow 45 and each of cylinders 34 and 35. Also a water-tight connection is made between the coupling and the casing. Pipe 48 connects elbow or T 45 with the interior of an inflatable life preserver of any desired type, generally identified at A, FIG. 1. Thus when the capsules are punctured, each by its firing pin 38 or 41, the pressurized gas therein is conducted to and inflates the life preserver which, of course, is provided with a conventional non-return valve.

A control lever and firing contact assembly comprises a horizontal bracket 49 which, as seen at FIGURE 5, is L-shaped in cross section. As indicated at 30, FIGURE 9, the outstanding flanges of the sides of the frame are slotted to receive the ends of the vertical flange of bracket 49, the horizontal flange thereof being cut back lightly for this purpose, by a distance equal to the thickness of flange 26b, for example. Thus upward movement of bracket 49 is positively limited to that shown at FIGURES 2, 5 and 7. At the same time it is held against movement normal to the plane of FIGURE 7. A screw 50 passes freely through a hole in the bracket assembly and is threaded into frame member 25 to thus prevent downward movement of the assembly out of slots 30, etc.

As is clear from inspection of FIGURES 2, 5 and 7, the horizontal flange 49a of bracket 49, has a pair of spaced holes of a diameter somewhat less than the maximum diameter of capsules 23 and 24 and in which the bulbous lower ends of the capsules respectively seat. Each of a pair of long machine screws 51 and 52, FIGURES 2, 5 and 7, extends loosely upwardly through a hole in flange 49a and threads into a respective hole in the horizontal flange of top frame member 31. When these screws are tightened the flange 49a is pulled upwardly slightly to firmly grip the capsules between the two flanges just mentioned. When back plate 7 is removed from the casing and screws 50, 51 and 52 are also removed, bracket 49 and all parts carried thereby may be removed by downward translation thereof, referring to FIGURES 2 and 7.

A hammer release lever 53 is shaped as shown upon FIGURE 10. The vertical flange 53a thereof is pierced at 54 to accommodate a pin 55 on which the lever is mounted for pivoting about an axis normal to the plane of FIGURE 7. The back surface of the flange 53a is in contact with the adjacent flange of bracket 49. A reinforcing plate 56, FIGURE 5, is relatively thick but is cut away over a limited area of its back surface to form a projection of reduced thickness and which extends over the area of flange 53a about hole 54. See FIGURE 4. The projection of plate 56 is thus spaced forwardly of bracket 49 by the thickness of flange 53a so that, with pivot pin 55 in place, the lever is mounted for smooth, guided, but limited pivotal movement in the plane of FIGURE 7. Inspection of FIGURE 9 shows how the outstanding flange of frame member 26 is cut away at 58 to pass lever 53 for guided pivoting. Plate 56 may be permanently attached to bracket 49 by welding or riveting. A second or stop plate 59, FIGURE 7, is secured by screw 60 to the inside face of flange 26b and has a slender projection extending under lever 53 to limit clockwise pivoting thereof to the position shown upon FIGURE 7. As also indicated upon this figure, the plate has an upward projection extending over the outer edge of flange 49a to assist the holding action of screw 50.

A plunger rod 63 passes with a smooth fit through aligned apertures in the outstanding flanges or shelves of frame members 31 and 49 and is thus guided for vertical, axial reciprocation. An arm 61 is centrally apertured to pass the threaded upper end of the plunger. Nuts 62 threaded to the plunger, clamp the arm rigidly thereto and enable vertical adjustment therealong. The plunger is urged downwardly by a strong coil spring 64, FIGURES 5 and 7, which abuts member 31 at its top end and a collar 65 at its lower end. The collar is fixed to the plunger in any convenient way, as by a set screw, not shown. The plunger is thus at all times urged downwardly into a position wherein arm 61 will engage the firing pins and drive them into, and puncture, the upper necked ends of the capsules or containers. As clearly shown upon FIGURE 10, lever 53 has an integral ledge with beveled surface 57a. The parts are so arranged and disposed that, as shown upon FIGURES 2, 4 and 5, the rounded lower end of plunger 63 rests upon this beveled surface when the plunger is in the upward, or cocked position of FIGURE 2, but just clears the edge of the surface when in the fired position of FIGURE 7. A coil spring 66 surrounds plunger 63 at its portion above flange 31 of the frame, and is of such length that it comes into action, or is compressed, a little prior to movement of hammer 61 into its lowermost position. At this time, as plunger 63 moves downwardly, the lower end of spring 66 engages flange 31 so that the spring becomes somewhat compressed. Thus, after puncturing of the capsules has taken place, the spring acts to raise hammer 61 slightly above the contiguous ends of the firing pins. This enables the light springs one of which is identified at 34d, FIGURE 11, to raise the pins to their maximum elevation so that new capsules may be emplaced without possibility of having them prematurely punctured.

An intermediate lever 67 is pivoted between its ends to plate 7, as at 68, FIGURE 7. This lever is shown in side elevation at FIGURE 3, from which it is noted that it is set out a little from plate 7 by spacer 69 and has its ends offset outwardly. The arrangement is such that the top end is coplanar with an armature 70 subsequently described, while the lower end thereof is positioned to engage beneath the distal end of lever 53 when the parts are in the cocked position of FIGURE 2. The upper end of layer 67 is notched as clearly indicated at 71, FIGURES 2 and 7. As there shown, the contacting ends of levers 53 and 67 are complementally beveled so that in the cocked position the thrust of spring 64 effects a component torque upon lever 67 urging it into counter-clockwise pivoting, as viewed upon FIGURE 2.

Armature 70 is a simple metallic plate mounted by a flat or leaf spring to flange 31 of the frame. Connection may be made by riveting, so that the armature may move a short distance in the vertical direction under attraction by electromagnets 72 and 73, which are carried by a bracket 74 secured to back plate 7 by screws 75. When the parts are in cocked positions and the electromagnets are de-energized, the distal end of armature 70 is in notch 71 of intermediate lever 67 to hold it in clockwise position wherein its lower end it held beneath the distal end of lever 53. The latter, in turn, acts to hold plunger 63 elevated against the strong downward thrust of spring 64.

The electromagnets are in a circuit including, in series, a switch and four penlight dry cells. The switch includes a first or grounded contact 76 secured as by riveting, centrally to the forward edge of horizontal flange 49a of bracket 49. A long and very flexible non-metallic strap 77, best shown upon FIGURE 3, has a contact point 78 riveted to its lower end. The upper end of the strap is inturned and secured to the top surface of flange 33 as by riveting. A lead, not shown, of very flexible insulated wire extends from contact 78 to one terminal wire of electromagnet 72. A strip of flexible dielectric material 80, such as pressed ground cork, is secured to and over strip 77.

The mounting for the dry cell pack consists of simple L-shaped brackets 84 and 85, top and bottom, secured as by machine screws such as 86, FIGURE 7, to back plate 7, in positions with their horizontal shelf portions spaced and parallel, to receive the cells between them and with a smooth fit. A screw 87 passes freely through a hole centrally of the shelf portion of bracket 85 and threads into a correspondingly-positioned hole in bracket 84 so that when turned down, it acts to draw the two portions slightly together thus clamping the cells in contact-effecting positions.

The lower surface of the shelf of bracket 84 has one insulated metallic strip which is positioned to electrically connect, for example, cells 81 and 82. This shelf also has one other insulated contact positioned to make electrical contact with the two remaining cells. One of these contacts is grounded to screw 43, FIGURE 2, while the other lead 88, FIGURE 7, connects to electromagnet 73. The upper surface of the shelf of bracket 85 has two spaced, parallel insulated strips extending in a direction at right angles to the aforesaid strips of bracket 84. Each is positioned to electrically connect a respective pair of the cells. Thus when the pack of four cells is assembled in reversed relation such as, considered in a clockwise sense and looking down, FIGURE 7, the poles are positive, negative, positive, negative, all cells are connected in series. One terminal of each of the electromagnets are joined and the remaining lead, not shown, extends from electromagnet 72 to contact 78.

Thus when contact 78 moves into engagement with 76, a circuit is completed through the cells and electromagnets. It will be noted that when front plate assembly 10 is in position, leather pieces 22, 22a overlie and contact strip 80 previously described as secured to switch arm 77 and thus increase the sensitivity of the instrument by filling the very small spacing between contact strip 80 and diaphragm 21. Thus a pressure of as little as one or two inches of water deflects diaphragm 21 sufficiently to close the circuit.

A simple and effective way to emplace cells 81, 82, etc., is to bind them together with adhesive tape to form a pack, remove screw 87, slip the pack into position between brackets 84, 85, and replace and tighten the screw. Capsules 23 and 24 are emplaced simply by removing screws 51, 52 and 50, dropping out bracket 49 and the parts connected therewith, positioining the capsules with necks upwardly, and replacing the parts, taking care to tighten screws 51, 52 so that a pressure-tight connection is effected between the neck of each capsule and the rubber bushing within sleeves or cylinders 34 and 35. It should also be noticed that the two springs such as 34d, FIGURE 11, act to compress seal 34a about the respective firing pins and thus assist in preventing leakage of pressurized gas about the pins.

At 89, FIGURES 2 and 7, there is shown a safety comprising a short shaft journaled in back plate 7 adjacent the right end of armature 70. The shaft is fitted with a Phillips screw head positioned so that it may be turned with a screw driver at the back of the instrument, from the exterior thereof. The shaft has integral with its end inside the casing, an offset or eccentrically positioned crank arm extending forwardly into the plane of pivoting of the armature. When the parts are in the cocked position of FIGURE 2, the shaft may be turned until its crank arm lies above and against the armature so that it cannot pivot counterclockwise and, of course, cannot move free of lever 67. Thus the parts may be held against firing even although the electrical circuit should be accidentally or unintentionally closed. When safety 89 is rotated so that its crank arm is in the position shown upon FIGURE 7, the parts are conditioned to release the plunger and hammer arm 61, in response to energization of the electromagnets. Markings, not shown, are provided upon the exterior surface of back plate 7, adjacent the head of shaft 89 and which, in cooperation with an indicium upon the head, indicate the safe and released positions, respectively, of the shaft.

OPERATION

With the invention prepared as just described, and front plate assembly 10 removed, arm 61 is raised, as by a pair of long-nosed pliers, to a position a little above that shown upon FIGURE 2. Elevation of plunger 63 enables lever 53 to be elevated about its pivot 55 until lever 67 can pivot so that its lower end engages beneath the distal end of lever 53. Then armature 70 drops into place in the notched upper end of lever 67, all as depicted upon FIGURE 2. In this cocked position, of course, spring 64 acts to urge the plunger downwardly, but is prevented from doing so by the interengaging levers and armature.

Plate assembly 10 is then replaced and the instrument is attached as at 48, FIGURE 1, to the life saver or other article to be inflated. When the person wearing the life saver jumps into the water or otherwise becomes immersed, a very slight hydraulic pressure of as little as one or two inches of water acting on diaphragm 21, through holes in plates 11 and 18, deflects the diaphragm sufficiently to close contact 78 against contact 76. The electromagnets are thereby energized over the circuit previously traced and draw armature 70 upwardly out of engagement with lever 67. Due to the cam surfaces on the contacting ends of lever 53 and 67, previously mentioned, lever 53 is released by lever 67. Plunger 63 immediately snaps downwardly under urge of spring 64, and arm 61 strikes the firing pins 38 and 41, driving each into, and puncturing its capsule. The released gas is directed by pipes 46 and 47 into the life saver to inflate the same.

Thus I have provided an inflating mechanism fulfilling all of the objects stated. The instrument is extremely sensitive, reliable and versatile. Operation is automatic and practically instantaneous in response to immersion so that even if the wearer is unconscious, the life saver is inflated as soon as a slight immersion of the instrument occurs.

While I have disclosed the form of the invention presently preferred by me, numerous changes of shape, size, relation and disposition of parts will readily occur to those skilled in the art, after a study of the foregoing specification. Consequently the disclosure should be taken in an illustrative rather than a limiting sense; and it is my desire and intention to reserve all modifications and changes within the scope of the subjoined claims.

In the claims, references to the vertical, horizontal, upper, lower, etc. are for convenience and clarity of expression only, and refer to the positions of the parts as they are viewed upon the drawing, particularly FIGURES 2 and 7. It will be understood however that the instrument is operable irrespective of any particular position or relation with respect to the vertical and horizontal. The term "hammer" or "hammer means" referred to the model illustrated, includes plunger 63 and arm 61 as a unit.

Having thus fully disclosed the invention, what I claim and desire to secure by Letters Patent is:

1. An inflating mechanism for a life preserver, comprising, a pressure-tight casing having a pressure-deflectable diaphragm forming one wall thereof, means in said casing constructed and arranged to fix a puncturable, pressurized gas container therein, a firing pin mounted in said casing and movable from a first position free of a container fixed as aforesaid, to a second position puncturing the same, a hammer movable to strike said firing pin and drive the same to its said second position, means urging said hammer into movement striking said firing pin, latch means engageable with said hammer to releasably hold the same free of said firing pin, electromagnetic means in said casing energizable to move an element of said latch means to release said hammer to movement by said urging means, contact means in said casing closed by and in response to pressure acting externally on said diaphragm, and a circuit including said contact means and electromagnetic means.

2. The inflating mechanism of claim 1, said casing comprising a back wall and top, bottom and side walls, all interconnected, and a front wall assembly comprising a cover plate having perforations therethrough, said diaphragm comprising an imperforate first plate having a smooth fit within said top, bottom and side walls and fixed with said cover plate in pressure-tight, spaced parallel relation therebeneath, to encompass the perforations therein, said cover plate having its peripheral edges secured in pressure-tight relation with the forward edges of said top, bottom and side walls.

3. The inflating means of claim 2, said back wall being detachably secured in fluid-tight relation with the rearward edges of said top, bottom and side walls, said firing pin, hammer, latch means, and electromagnetic means all being carried by said back wall and removable as a unit therewith.

4. The inflating means of claim 3, a pair of brackets fixed to said back wall and forming upper and lower spaced parallel shelves outstanding from said back wall, said shelves being constructed and arranged to receive a pack of dry cells therebetween, means engaging said shelves and operable to flex the same together to clamp said cells in place, and electrical connections carried by said shelves and engaging said cells when emplaced, to connect the same in series.

5. Inflating means for a life-saving device, comprising, a fluid-tight casing, a frame fixed in said casing and constructed and arranged to mount a puncturable container of pressurized gas, a firing pin reciprocably mounted in said frame for movement from a first position free of a container so mounted, to a second position puncturing the same, conduit means fixed with said frame to make pressure-tight contact with a container and to conduct gas therefrom to the exterior of said casing, a hammer reciprocably mounted in said frame for movement from a first position free of said firing pin, to a second position driving the same into, and puncturing a container mounted as aforesaid, spring means engaging and urging said hammer to second position, a hammer release lever mounted at one end in said frame for pivoting about a first axis and having a ledge between its ends engageable with said hammer to hold the same in its said first position, an intermediate lever mounted in said casing between its ends, for pivoting about a second axis parallel with and offset from said first axis, and having a first end releasably engaging the distal end of said release lever to hold said hammer in first position, an armature mounted in said casing for movement from a first position engaging the second end of said intermediate lever and holding the same in engagement with said release lever, to a second position free and clear of said intermediate lever, electromagnetic means energizable to attract and move said armature to second position, and means responsive to deflection of one wall of said casing, by external pressure thereon, to energize said electromagnetic means.

6. The inflating means of claim 5, said hammer comprising a plunger mounted for axial reciprocation and having a rounded lower end, said ledge being constructed and arranged to move out of the path of reciprocation of said plunger when released by said intermediate lever.

7. In an automatically operable pressure-responsive inflating means, a fluid-tight casing, a frame fixed within said casing and defining spaced parallel top and bottom ledges, first and second laterally-spaced parallel sleeves fixed within respective apertures in said top ledge and each having an open lower end facing said bottom ledge, each said sleeve being adapted to receive in its said open lower end and with pressure-tight connection, the puncturable end of a respective one of two containers of gas under pressure, first and second firing pins each reciprocably mounted in the other end of a respective one of said sleeves, for translation to a position puncturing a container received therein and having its lower end in contact with said bottom ledge, a plunger mounted for reciprocation between and parallel with said sleeves, a cross arm fixed with the upper end of said plunger with its ends overlying the exposed ends of said firing pins, respectively, spring means urging said plunger into position wherein said arm engages and forces said firing pins to container-puncturing position, a coupling fixed with said casing and extending exteriorly thereof, conduit means connecting the interior of each said sleeve with said coupling, means releasably restraining said plunger against the urge of said spring means, electromagnetic means in said casing and energizable to release said restraining means, and means energizing said electromagnetic means by and in response to pressure on said casing.

8. Inflating means as in claim 7, and screw-threaded means connecting said ledges and operable to releasably flex said ledges together to clamp the containers each between said lower ledge and the lower open end of a respective one of said sleeves.

9. In an automatic inflating means for a life preserver, a fluid-tight casing including a diaphragm in one wall thereof, a frame fixed within said casing and adapted to fixedly mount therein a container of pressurized gas, a coupling carried by said casing exteriorly thereof to make pressure-tight connection with an article to be inflated, conduit means in said casing adapted to effect pressure-tight communication between the container and said coupling, a firing pin mounted in said casing for movement from a first position clear of the container, to a second position puncturing the same within said conduit means, plunger means in said frame and movable from a first position free of said firing pin, to a second position striking said firing pin to drive the same to its said second position, lever means engageable with said plunger means to releasably hold the same in its said first position, and including an armature, electromagnetic means fixed in said casing and energizable to operate said armature and release said lever means, a contact closer in said casing, responsive to deflection of said diaphragm, and a circuit including said electromagnetic means and contact closer.

10. In an automatically operable pressure-responsive inflating means, a pressure-tight casing, a frame fixed within said casing and defining spaced parallel top and bottom ledges, a sleeve fixed with said top ledge and having an open end facing said bottom ledge to receive the puncturable end of a container of gas under pressure, clamped between said ledges, means operable to flex said ledges together to clamp a pressurized container therebetween, a firing pin mounted in and by the other end of said sleeve for movement to puncture a container fixedly and releasably held by and between said ledges, a coupling fixed with said casing and projecting through one wall thereof to the exterior, a conduit connecting the interior of said sleeve with said coupling, a plunger extending through aligned apertures in said ledges and guided for axial translation thereby, an arm fixed with said plunger at one end thereof and extending over said firing pin to drive the same into the container in response to one direction of translation of said plunger, spring means connected with and urging said plunger into movement in said one direction, a lever pivoted in said frame on an axis normal to said one direction and engageable in one position of pivoting with the other end of said plunger to releasably hold the same against movement by said spring means, latch means engaging said lever to releasably hold the same in said one position, electromagnetic means energizable to move said latch means to release said lever, a pressure deflectable diaphragm forming a part of one wall of said casing, a switch in said casing closed by and in response to deflection of said diaphragm, a source of E.M.F. in said casing, and a circuit including said electromagnetic means, switch means, and source.

11. In an inflating device for a life saver, a frame adapted to releasably hold a container of gas under pressure, firing pin means carried by said frame for movement to puncture a container held as aforesaid, plunger means movably mounted in said frame to engage said firing pin means and drive the same into a container held as aforesaid, to puncture the same, spring means urging said plunger means to container-puncturing position, lever means releasably engaging and holding said plunger means in cocked position free of said firing pin means, an electromagnet energizable to attract and release said lever means, a circuit for said electromagnet including a pressure-responsive switch, and conduit means to conduct gas under pressure from a container when punctured, and connectable with an inflatable life saver, said plunger means comprising a rod mounted for axial reciprocation and an arm adjustably fixed to one end of said rod to overlie said firing pin means, a bracket removably fixed with said frame and including a shelf, said rod passing with a smooth fit through an aperture in said shelf for guidance thereby, said lever means including a release lever pivoted at one end in said bracket and including a ledge engageable with the other end of said rod, only when said rod is in position with its arm remote from said firing pin means.

References Cited by the Examiner

UNITED STATES PATENTS

| | | | |
|---|---|---|---|
| 1,949,850 | 3/34 | Willard | 222—201 X |
| 2,786,599 | 3/57 | Higbee | 222—5 |
| 2,903,718 | 9/59 | Wright | 9—9 |
| 2,994,892 | 8/61 | Paradis | 9—9 |

LOUIS J. DEMBO, *Primary Examiner*.

RAPHAEL M. LUPO, *Examiner*.